United States Patent

[11] 3,568,068

[72] Inventor Daniel D. Russell, Jr.
Harwood Heights, Ill.

[21] Appl. No. 675,104
[22] Filed Oct. 13, 1967
[45] Patented Mar. 2, 1971
[73] Assignee Motorola, Inc.
Franklin Part, Ill.

[54] SQUELCH CIRCUIT FOR FREQUENCY MODULATION RECEIVER
5 Claims, 1 Drawing Fig.

[52] U.S. Cl. .......... 325/348, 325/319, 325/478
[51] Int. Cl. .......... H04b 1/10
[50] Field of Search .......... 325/348, 319, 64, 392, 466, 478, 344; 330/22; 179/1 (VC)

[56] References Cited

UNITED STATES PATENTS

| | | | |
|---|---|---|---|
| 2,602,885 | 7/1952 | Armstrong | 325/348 |
| 2,997,580 | 8/1961 | Lohrer | 325/348 |
| 3,004,156 | 10/1961 | Coleman et al. | 325/348 |
| 3,188,571 | 6/1965 | Michael | 325/348X |
| 3,027,455 | 3/1962 | Kelley et al. | 325/478X |
| 3,056,086 | 9/1962 | Brauner | 325/319 |
| 3,196,354 | 7/1965 | Engelbrecht | 325/319 |
| 3,300,723 | 1/1967 | Hansen | 325/348 |
| 3,336,533 | 8/1967 | Glasser | 330/51 |

*Primary Examiner*—Robert L. Griffin
*Assistant Examiner*—Benedict V. Safourek
*Attorney*—Mueller and Aichele

ABSTRACT: Squelch circuit for frequency modulated receiver having a wide band discriminator which reproduces the modulating signal and noise extending at frequencies substantially higher than the modulating signal, with the noise increasing in amplitude in the absence of the modulating signal. The full frequency range of the discriminator output is applied through a limiter and a level control potentiometer to a frequency selective circuit which selects noise extending above the modulating frequency. The selected noise is detected and amplified in a full wave semiconductor circuit and applied to bias off the first audio stage of the receiver when the noise exceeds a predetermined voltage.

PATENTED MAR 2 1971 3,568,068
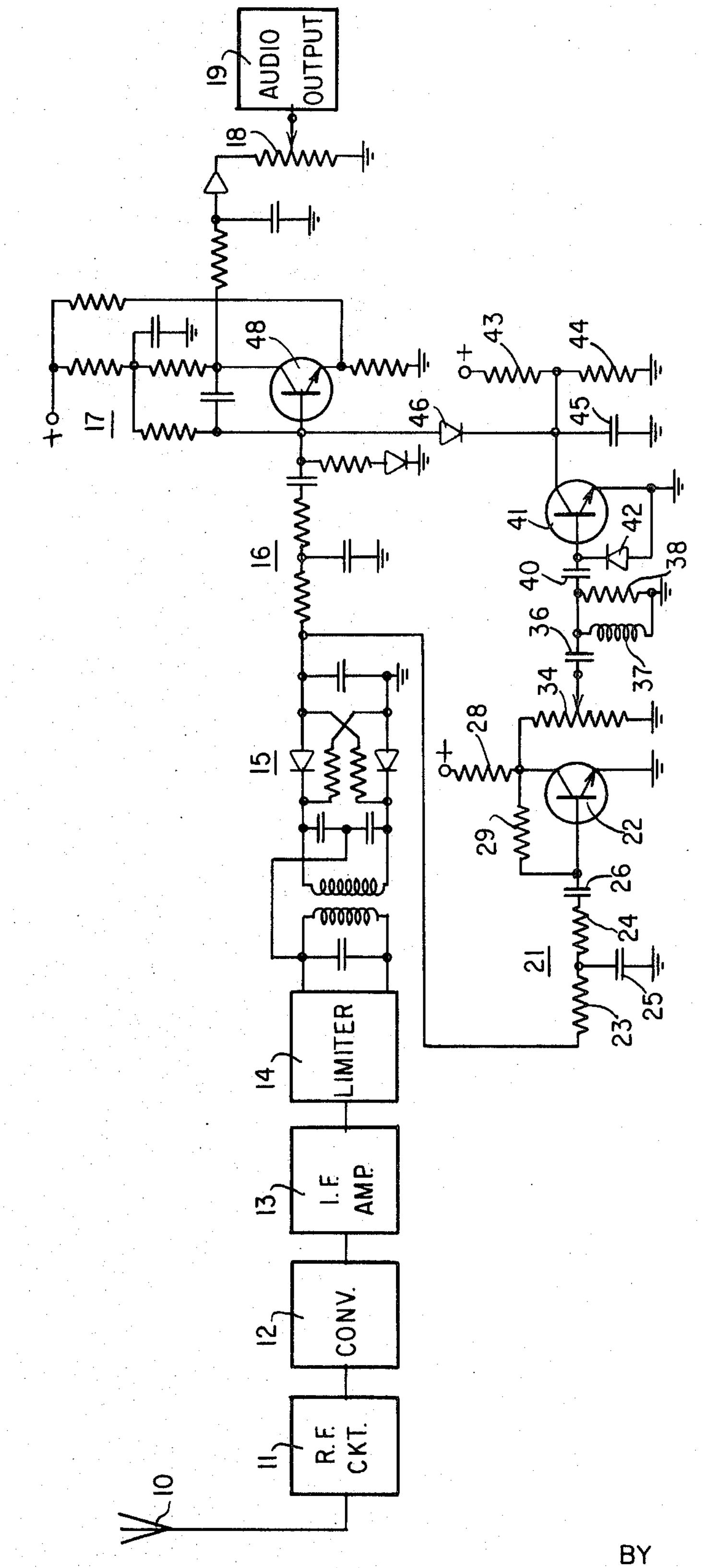
Inventor
DANIEL D. RUSSELL JR.
BY
Mueller, Aichele & Rauner
Attys.

SQUELCH CIRCUIT FOR FREQUENCY MODULATION RECEIVER

BACKGROUND OF THE INVENTION

High gain receivers, such as frequency modulation communication receivers, amplify noise which is picked up or generated in the receiver in the absence of a signal to produce a noise output which is very irritating. To eliminate this noise output, squelch circuits have been used to cut off the audio output in the absence of a receiver signal. The squelch circuit may operate in response to a tone transmitted with the signal to actuate the squelch circuit, or in response to the increased noise in the absence of a signal. This latter type of system has been relatively complex because it must discriminate between noise and the modulating signal. Also, noise may be present with a usable signal and in such case it is desired that the audio not be squelched so that the intended signal can be received, even though a relatively high level of noise may be present.

SUMMARY OF THE INVENTION

It is an object of the present invention to provide a simple and improved squelch circuit for a frequency modulation receiver which responds to increase in noise in the absence of a signal to provide a voltage to cut off or squelch the audio stages of the receiver.

Another object of the invention is to provide a noise-operated squelch circuit which is sensitive to the increase in noise in a frequency modulation receiver in the absence of a signal and does not clamp or cut off the audio when modulation is received, or lock up because of distortion which provides modulation components in the band of noise which controls the squelch operation.

The receiver of the invention is of the frequency modulation type having a discriminator which provides an output including the modulating signal and in a noise extending frequency range above the frequency of the modulating signal, and which noise has increased amplitude in the absence of the modulating signal. The full frequency range of the discriminator output is applied through a limiter and a level control circuit to a frequency selective circuit which elects noise in a band above the modulating signal. The selected noise is detected and amplified and applied as a control voltage to the audio stage. When the noise reaches a predetermined amplitude, the control voltage acts to turn off the audio stage and squelch the receiver. The noise detector includes a transistor and a diode arranged to provide full wave rectification and amplification, so that an adequate control voltage is provided in a minimum number of stages. The detector is coupled to the audio stage through an isolating diode so that the attack time of the squelch operation can be controlled without affecting the audio bias.

The invention is illustrated in the single FIGURE of the drawing which shows the discriminator, audio and squelch circuits of the receiver in circuit diagram and the remaining stages in block diagram.

DETAILED DESCRIPTION OF THE PREFERRED EMBODIMENT

Referring now to the drawing, the receiver of the invention includes an antenna 10 for applying signals to a radio frequency (RF) circuit 11 which includes frequency selective circuits, and may or may not include amplifying circuits. The selected signal is applied to converter 12, which may include one or more stages of frequency conversion, to provide an intermediate frequency (IF) signal. The intermediate frequency signal is amplified in stages indicated at 13 and limited in further stages indicated at 14. The limited intermediate frequency signal is applied to discriminator 15 which may be of known circuit configuration and which is constructed to reproduce the frequency modulation signals and signals which extends substantially above the frequencies of the gain control modulation signals. The audio output of the discriminator is applied to the audio amplifier 17 by a filter 16 which cuts off just above the highest modulation signal to attenuate high frequency noise in the discriminator output. The audio signal is amplified in audio amplifier 17 and applied through potentiometer 18 to audio output stages 19. The audio output stages may include a loudspeaker or other device for reproducing the modulation signal.

The output of the discriminator 15 is applied through coupling circuit 21 to a limiter stage including transistor 22. The coupling circuit includes resistors 23 and 24 and capacitors 25 and 26, and acts to reject the intermediate frequency signal but applies the full frequency range of recovered modulation and noise signals from the discriminator to the limiter. The coupling circuit also acts to decouple the limiter from the discriminator so that the discriminator is not loaded thereby.

The transistor 22 is biased so that its output is limited. Resistor 28 applies a bias to the collector of transistor 22, and resistors 28 and 29 apply a bias to the base thereof. When a signal is received, the output of the limiter includes the signal and the amount of noise in the limited output is therefore reduced. This action reduces the noise which is received in the presence of a weak signal so that the noise does not act to squelch the receiver. The output of the limiter is derived from the collector of transistor 22 and applied to variable control potentiometer 34. This potentiometer forms the threshold control of squelch circuit. Since the potentiometer 34 is at the output of the limiter it is isolated thereby and does not load the discriminator.

A portion of the signal as determined by the setting of the potentiometer 34 is applied to the high-pass filter circuit including capacitor 36, inductor 37 and resistor 38. This filter selects noise extending in a frequency range such as from 3 to 20 kilohertz. It has been found that noise between 10 and 20 kilohertz is particularly effective for squelch action, and the squelch sensitivity is increased when noise in this range is used. Signals below 3 kilohertz are attenuated by the filter so that squelch action does not take place in response to the modulation signal.

The selected noise signal is applied through capacitor 40 to the noise detector circuit including transistor 41 and diode 42. Diode 42 and the diode formed by the base and emitter electrodes of transistor 41 are connected in parallel to conduct in opposite directions, and cooperate to form a full wave rectifier. Diode 42 conducts during negative half-cylces of the selected noise signal to rectify the signal and charge capacitor 40, and the voltage across capacitor 40 is added to the positive half-cycles of the signal which cause transistor 41 to conduct and amplify the rectified signal. This circuit is not frequency selective and responds to all signals applied thereto through the filter. An operating bias is applied to the collector of transistor 41 by the voltage divider including resistors 43 and 44, so that it functions as an amplifier. The rectified current is, therefore, amplified at the collector electrode to provide the squelch control voltage across resistor 44 and capacitor 45.

The squelch control voltage is applied through diode 46 to the base electrode of transistor 48 of the audio stage 17. When transistor 41 conducts because of the rectified noise, it reduces the voltage across resistor 44 which is applied to the base of transistor 48, and this transistor is cut off to squelch the audio signal. When the noise is reduced and transistor 41 cuts off, the voltage across resistor 44 rises and back-biases diode 46 so that the squelch circuit is decoupled from the audio transistor 48. Diode 46, therefore, isolates the squelch control voltage from the bias voltage applied to the base of transistor 48, so that the attack time of the squelch circuit is independent of the bias applied to the audio stage 17. This makes it possible to control the squelch circuit to eliminate squelch tail, which is an objectionable noise produced as the squelch operates to cut off the audio.

In a circuit which has been found to operate satisfactorily, the following component values have been used. It is pointed out that these values are merely representative and satisfactory circuits can be provided using components having other values.

| | |
|---|---|
| Transistor **22** | Type M9532, Motorola, Inc. |
| Resistor **23** | 10 kilohms |
| Resistor **24** | 12 kilohms |
| Capacitor **25** | 220 picofarads |
| Capacitor **26** | 0.02 microfarads |
| Resistor **28** | 12 kilohms |
| Resistor **29** | 220 kilohms |
| Potentiometer **34** | 25 kilohms |
| Capacitor **36** | 0.003 microfarads |
| Inductor **37** | 11 millihenries |
| Resistor **38** | 2.2 kilohms |
| Capacitor **40** | 0.02 microfarads |
| Transistor **41** | Type M9532, Motorola, Inc. |
| Diode **42** | Germanium diode |
| Resistor **43** | 39 kilohms |
| Resistor **44** | 47 kilohms |
| Capacitor **45** | 10 microfarads |
| Diode **46** | Germanium diode |
| Transistor **48** | Type M9532, Motorola, Inc. |

The squelch circuit described is extremely simple and has been found to operate satisfactorily in the presence of wide variations in temperature and operating voltage. The limiter reduces noise received with a weak signal to prevent clamping of the squelch, and the attenuation of signals in the modulation band prior to noise detection prevents clamping on the modulating signal. The noise detector is not frequency sensitive and provides amplification so that the required control action is provided without an additional switching stage. The squelch action is accomplished without affecting the bias of the audio stage by the use of a coupling diode which is back biased when the squelch is released so that the squelch circuit is decoupled from the audio stage.

I claim:

1. In a frequency modulation receiver including means for receiving a modulated wave for converting the same to an intermediate frequency wave, and including low frequency amplifying means for the derived modulating signal, the combination including, discriminator means for deriving from the intermediate frequency wave the modulating signal and noise signals extending in a frequency range substantially greater than the modulating signal, which noise signals increase substantially in amplitude in the absence of the modulating signal, limiter means, circuit means coupling said discriminator means to said limiter means for applying substantially the complete amplitude and range of frequencies of the modulating and noise signals produced by said discriminator means to said limiter means, said circuit means including means decoupling said limiter means from said discriminator means so that said discriminator means is not loaded thereby, frequency selective means coupled to said limiter means for selecting from the output thereof noise signals extending in a frequency range above the modulating signal, said limiter means producing a limited output in response to all modulating signals coupled thereto from said discriminator to thereby reduce the amplitude of noise signals in the presence of modulating signals at the output of said discriminator means, noise detector means for detecting and amplifying the noise signals selected by said frequency selecting means, said noise detector means including circuit means for developing a signal which represents the addition of the rectified signals produced by the negative and positive half-cycles of said selected noise signals, and second circuit means coupling said detector means to the low frequency amplifying means of the receiver for squelching the low frequency amplifying means in response to detected noise signals which reach a predetermined amplitude, said second circuit means isolating said noise detector means from said low frequency amplifying means when said low frequency amplifying means is not squelched.

2. The combination of claim 1 further including filter means coupling said discriminator means to the low frequency amplifying means for substantially attenuating signals having frequencies greater than the modulating signal.

3. The combination of claim 1 wherein said noise detector means includes a transistor having base, emitter and collector electrodes, a diode connected between said base and emitter electrodes and providing conduction in the direction opposite to the conduction between said base and emitter electrodes, and capacitor means coupling said frequency selecting means to said base electrode, said transistor, said diode and said capacitor means forming said circuit means for developing a signal which represents the addition of rectified signals produced by the negative and positive half-waves of said selected noise signals, and means applying biasing potential to said transistor for causing the same to amplify the rectified signals.

4. The combination of claim 1 including a potentiometer connected between said limiter means and said frequency selective means for controlling the amplitude of the signal applied to said frequency selective means.

5. The combination of claim 1 wherein said second circuit means coupling said noise detector means to the low frequency amplifying means includes diode means for applying a squelch voltage to said amplifying means, circuit means coupled to said diode means to back-bias said diode means, said diode means being back-biased when the detected noise signals fall below said predetermined amplitude to thereby isolate the amplifying means from said detector means.